United States Patent [19]

Hilborn

[11] 4,376,227

[45] Mar. 8, 1983

[54] THERMOCOUPLE SEAL

[76] Inventor: W. Dwight Hilborn, P.O. Box 5549, Pasadena, Tex. 77505

[21] Appl. No.: 266,122

[22] Filed: May 21, 1981

[51] Int. Cl.³ .................................... H01L 35/02
[52] U.S. Cl. .................................. 136/242; 136/230; 136/232; 228/126
[58] Field of Search ............... 136/208, 209, 211, 212, 136/230, 232, 233, 235, 242; 376/205; 219/148; 228/126, 131

[56]  References Cited

U.S. PATENT DOCUMENTS

| | | | |
|---|---|---|---|
| 3,844,883 | 10/1974 | Bevilacqua et al. | 376/205 |
| 4,195,457 | 4/1980 | Kissling et al. | 376/205 X |
| 4,278,828 | 7/1981 | Brixy et al. | 136/232 |

FOREIGN PATENT DOCUMENTS 764235  12/1956  United Kingdom ............... 228/126

Primary Examiner—Leland A. Sebastian
Attorney, Agent, or Firm—Robert W. B. Dickerson

[57] ABSTRACT

A device for pressure sealing a reactor or thermowell extending therein comprising a disc having individual tubes welded thereto and sheathed thermocouples passing through such tubes and brazed thereto.

9 Claims, 5 Drawing Figures

THERMOCOUPLE SEAL

BACKGROUND OF THE INVENTION

Thermocouples have long been used to measure temperatures within reactors or other vessels, such as may be used in the petrochemical industry. Examples of such thermocouple measuring devices are illustrated by U.S. Pat. Nos. 3,262,502 and 3,637,438. Thermocouple assemblies of such type comprise a number of thermocouple leads and junctions, usually encapsulated in a sheath which are inserted either directly within such a reactor or vessel, or inserted within a well which well is positioned within the vessel. The thermocouple leads exit the vessel or well to a junction box which contains electrical terminals, from which known instrumentation provides a temperature reading adjacent the diversely positioned thermocouple junctions. For safety reasons, it is desirable to pressure seal or insulate the interior of the reactor or vessel as to prevent pressure escape in the area where the thermocouple leads exit the vessel. An approach previously used has been to utilize compression fittings for the sheathed thermocouples. Such an approach has required excessive clearance around each fitting for wrench engagement. A more recent development utilizes multi-holed plates. Sheathed thermocouples are passed through such holes and are brazed to the plate. Such arrangement resulting in heating the entire plate in order to braze a single sheath. This is extremely delicate work and may result in damaging adjacent sheath-plate junctions when affixing or repairing a single sheath. It was to overcome these problems associated such multi-holed plates that this invention was developed.

SUMMARY OF THE INVENTION

Intermediate the juncture between a reactor well flange and an adjacent conduit flange, a disc or plate is fixedly positioned. Such disc includes a plurality of bores or apertures therethrough. Within each such bore a tubing stub is fixed, with one of its ends extending axially beyond the disc. Individually sheathed thermocouples are then passed through each tube and silver brazed to the free end of the tube.

DESCRIPTION OF A PREFERRED EMBODIMENT

Figure 1:
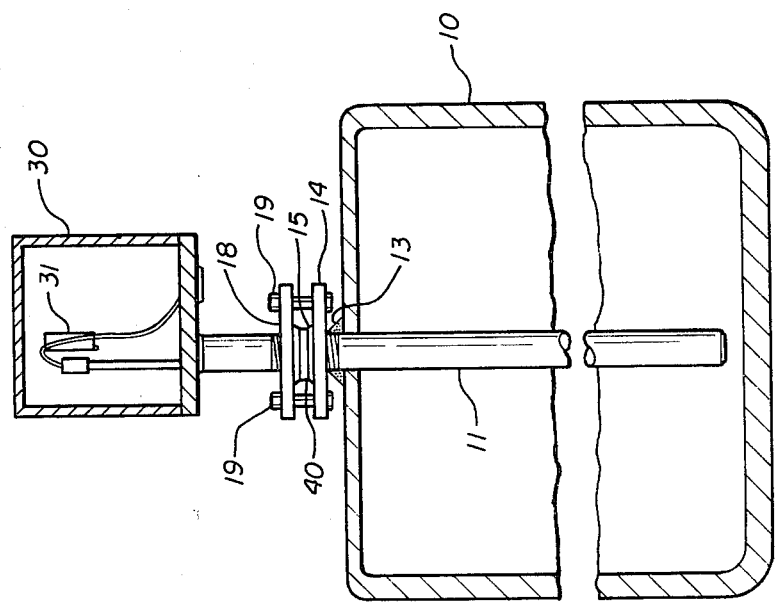
FIG. 1 is a front elevation, with parts broken away, of a complete thermocouple assembly.

FIG. 1 generally shows a pressure vessel or reactor 10 into which a thermocouple well 11 is inserted and welded thereto as at 13. Such well may include flange 14 and flange lip 15 at its free end. Insertable within the open well end is a thermocouple assembly, generally illustrated at 20. Such assembly may include a flexible support rod 21, a plurality of sheathed thermocouples 22 spirally wrapped therearound and thermocouple-positioning spiders 23 positioned therealong. Such an assembly does not comprise, as such, a part of this invention, and is more clearly described in the aforementioned U.S. Pat. Nos. 3,637,438 and 3,263,502. Above flange 14, the sheathed thermocouples would extend into a junction box 30 where the leads from the individual thermocouples would tie into an electrical junction strip 31, ground and metering instrumentation well known in the art.

Figure 3:
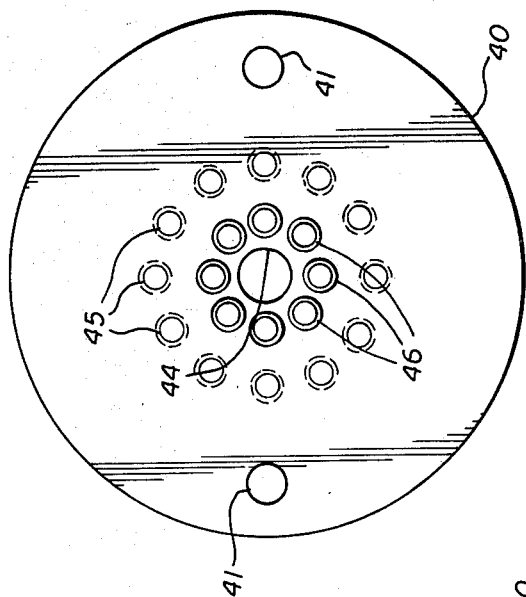
FIG. 3 is a top elevation of the seal plate of this invention.
Figure 2:
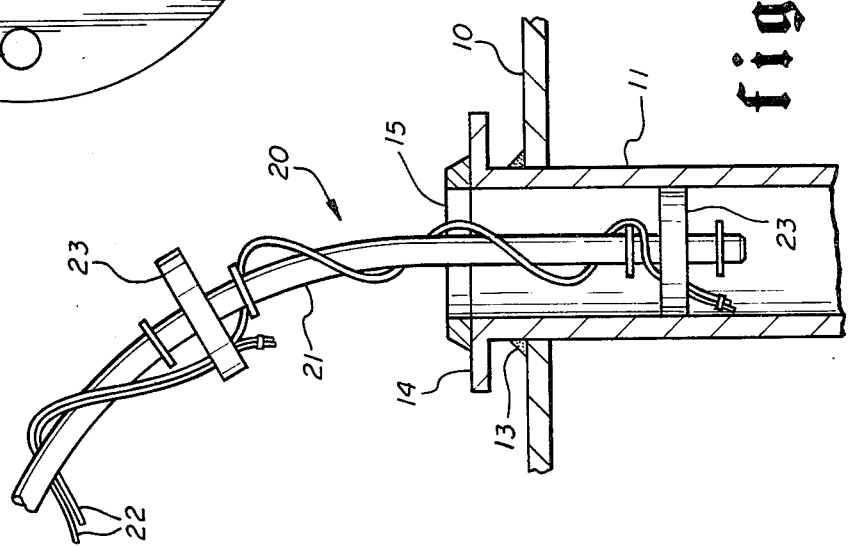
FIG. 2 is a partly broken front elevation of the lower end of thermocouple assembly as being inserted in a well.
Figure 5:
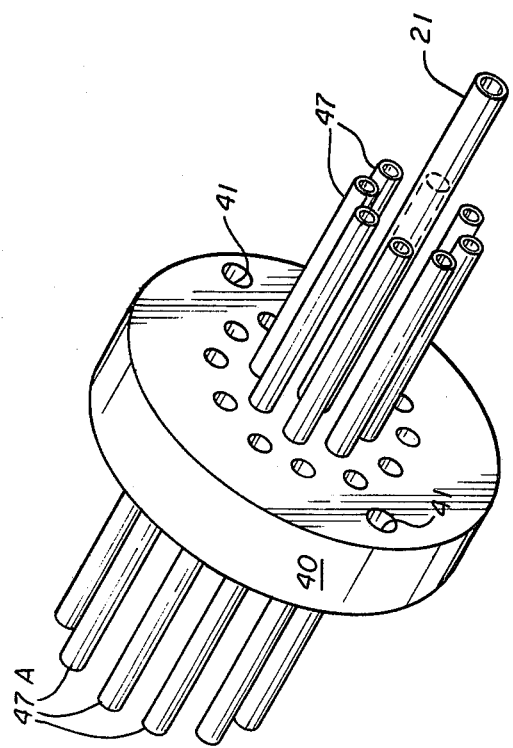
FIG. 5 is a perspective of the seal plate with tubes and support rod attached.
Figure 4:
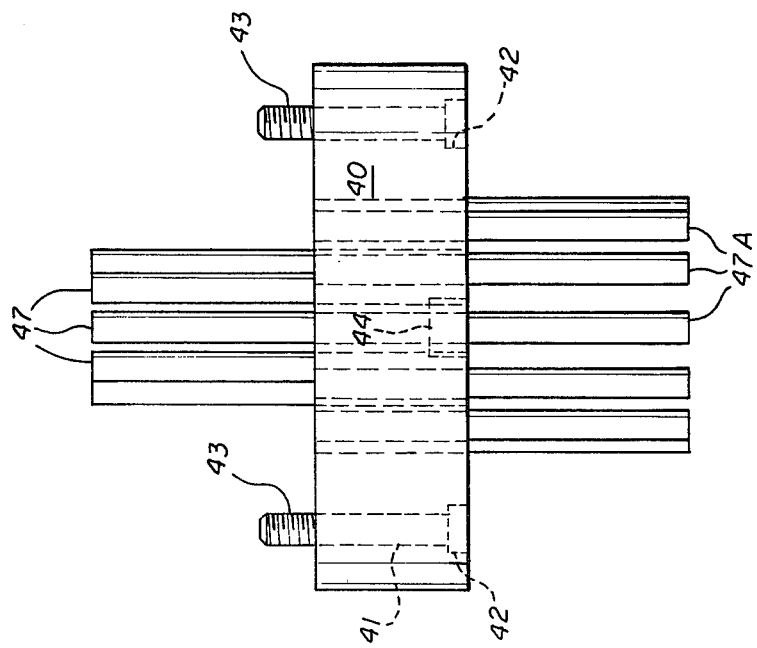
FIG. 4 is a front elevation of the seal plate.

Move now to FIGS. 3-5 which depict this invention. Plate or disc 40 would be positioned intermediate the lips 15 of thermocouple well flange 14 and of conduit flange 18. Such flanges are joined by bolts 19. Plate 40 includes spaced bores 41 and counterbores 42 for receiving bolts 43. The threaded ends of such bolts 43 are matingly received by threaded taps (not shown) in upper or conduit flange 18. Flexible thermocouple support rod 21 would have its upper end fixedly positioned, as by welding, to plate 40, preferably within socket 44. A plurality of passageways or bores extend axially through plate 40. FIGS. 3-5 depict a pair of concentric circles of bores 45 and 46. Such arrangement permits use with a large number of individually sheathed thermocouples. Within each such thermocouple-accommodating passageway, an individual tube or tubing stub 47 or 47A is inserted, and secured, as by welding, to plate 40. Such tubing would be fully inserted within such apertures 45,46 so that one end of tubes 47A, for example would be flush with the upper surface of plate 40 in FIG. 4 and the other tube end would extend well below the lower surface of plate 40. Individual sheathed thermocouples 22 (FIG. 2) would then be passed through such tubes 47, 47A and be silver brazed to the free end of the associated tube stub. The leads from the upper end of the sheathed thermocouple would extend within junction box 30, and the lower end extend within well 11.

This arrangement provides substantial benefits. For example, to remove the thermocouple assembly from the well, bolts 19 would be loosened. Since support rod 21 is secured to plate 40 and the plate secured by bolts 43 and flange 18, such flange, plate and thermocouple assembly may be removed from the well as a unit. More important, individual sheathed thermocouples 22 may be sealingly affixed to seal plate 40, or actually to its tube stubs 47, 47-A by brazing. This process not only forms an excellent seal but, because of the small mass of the tube at the point of sealing, requires a relatively small amount of heat and does not adversely affect the brazed seal of adjacent thermocouples. As mentioned, the concentric arrangement of tubes shown permits some sheaths to be brazed above plate 40 at the ends of tube 47 and some at the ends of tubes 47A. Obviously the brazing and tube welding form a pressure seal to prevent pressure escape from the reactor or thermocouple well.

Although only a single embodiment has been described, it should be obvious that numerous modifications would be possible by one skilled in the art without departing from the spirit of the invention, the scope of which is limited only by the following claims.

I claim:

1. A seal for use with a thermocouple assembly having a plurality of sheathed thermocouple leads, said seal comprising:

a plate having a plurality of thermocouple receiving bores therethrough;

tube means fixed in at least a plurality of said thermocouple receiving bores, each of said tube means having one end extending outwardly of said plate; and sheathed thermocouple leads extending through at least some of said tube means, each of said sheathed thermocouple leads being fixed to said one end of an associated tubes means.

2. The device of claim 1 wherein said sheathed thermocouple leads are affixed to their said associated tube means by brazed connection means.

3. A device for sealingly closing an entry to a pressure vessel wherein said pressure vessel includes a thermocouple assembly, said assembly including a plurality of sheathed thermocouples, at least partially inserted within said vessel, said device comprising:

plate means having a plurality of thermocouple-passing apertures for receiving individual ones of said sheathed thermocouples;

tubes positioned within at least some of said apertures, each of said tubes having one end extending beyond said plate means;

sheathed thermocouples passing through at least some of said tubes, each of said sheathed thermocouples being joined to said one end of an associated one of said tubes.

4. The device of claim 3 and including a pair of centrally bored flanged members clampingly receiving said plate means therebetween.

5. The device of claim 4 wherein one of said flanged members is releasably connected to said plate means.

6. The device of claim 5 wherein said plate means includes means for fixedly receiving a flexible support carried by said thermocouple assembly.

7. A method of fabricating a thermocouple seal comprising:

positioning open-ended tubes within at least some apertures of a multi-apertured plate means such that one end of each of said tubes extends beyond said plate means;

passing sheathed thermocouple means through each said tube; and brazing each said thermocouple means to said one end of an associated one of said tubes.

8. The device of claim 3 wherein each of said sheathed thermocouples are joined to said associated tube ends by brazing.

9. The device of claim 3 wherein some of said tubes extend from one face of said plate means and the remainder of said tubes extend from the opposite face of said plate means.

* * * * *